United States Patent
Blumenau et al.

(10) Patent No.: US 6,665,812 B1
(45) Date of Patent: Dec. 16, 2003

(54) STORAGE ARRAY NETWORK BACKUP CONFIGURATION

(75) Inventors: Steven Blumenau, Holliston, MA (US); Ola Mayer, Menlo Park, CA (US)

(73) Assignee: EMC Corporation, Hopkinton, MA (US)

( * ) Notice: Subject to any disclaimer, the term of this patent is extended or adjusted under 35 U.S.C. 154(b) by 537 days.

(21) Appl. No.: 09/746,166

(22) Filed: Dec. 22, 2000

(51) Int. Cl.$^7$ ................................................ G06F 11/00
(52) U.S. Cl. .......................................... 714/5; 711/162
(58) Field of Search .................. 714/5, 6; 711/162; 709/105

(56) References Cited

U.S. PATENT DOCUMENTS

| | | | |
|---|---|---|---|
| 5,210,866 A | * 5/1993 | Milligan et al. | 714/6 |
| 5,404,508 A | * 4/1995 | Konrad et al. | 707/202 |
| 5,835,915 A | * 11/1998 | Carr et al. | 707/202 |
| 6,076,148 A | * 6/2000 | Kedem | 711/162 |
| 6,105,078 A | * 8/2000 | Crockett et al. | 710/18 |
| 6,154,850 A | * 11/2000 | Idleman et al. | 714/5 |
| 6,178,521 B1 | * 1/2001 | Filgate | 714/6 |
| 6,446,175 B1 | * 9/2002 | West et al. | 711/162 |
| 6,543,001 B2 | * 4/2003 | LeCrone et al. | 714/6 |
| 6,578,158 B1 | * 6/2003 | Deitz et al. | 714/11 |

* cited by examiner

Primary Examiner—Robert Beausoliel
Assistant Examiner—Bryce P. Bonzo
(74) Attorney, Agent, or Firm—Fish & Richardson P.C.

(57) ABSTRACT

A redundant communication network includes servers having production servers and a backup server; a storage system including a plurality of production volumes for storing data and a corresponding plurality of backup volumes connected to each of the production volumes. The redundant communication network also includes a first channel and a second channel for allowing communication between the production servers and the production volume of the storage system and a backup storage unit connected to the backup server. A method for performing a backup operation on the network includes the following steps. One of the production servers selects one of the production volumes for backup. The selected one of the production volumes is disconnected from a corresponding one of the plurality of backup volumes. The relative load on each of the first and second channels of the redundant communication network is determined. If necessary, the load on each of the first and second channels is adjusted during the backup operation. Data stored on the corresponding one of the backup volumes is transferred to the backup storage unit. When the backup operation is complete, the selected one of the production volumes is reconnected to the corresponding one of the backup volumes.

19 Claims, 2 Drawing Sheets

STORAGE ARRAY NETWORK BACKUP CONFIGURATION

BACKGROUND OF THE INVENTION

The invention relates generally to the field of information storage systems and more particularly to managing backup of data in storage systems.

Storage systems have grown enormously in both size and sophistication in recent years. These storage systems can be a part of a "storage area network" (SAN), an open-standard, generally high speed, scalable network of servers and storage. An SAN advantageously provides accelerated data access, supports advanced storage management, and serves as a natural platform for clustered server applications.

SANs typically include many large disk drive units controlled by a complex, multi-tasking, disk drive controller such as the EMC Symmetrix® disk drive controller, a product of EMC Corporation, Hopkinton, Mass. A large scale disk drive system can typically receive commands, such as I/O requests, from a number of host computers and can control a number of disk drive mass storage devices, each mass storage device capable of storing in excess of ten of gigabits of data. The EMC Symmetrix® disk drive controller is a controller which allows multiple connectivity by hosts of different vendors. In such arrangements, the storage system is referred to as an "enterprise" data storage system.

There is every reason to expect that both the sophistication and the size of the disk drive systems will continue to increase. As these systems increase in complexity, so does a user's reliance upon the system for fast and reliable recovery and storage of data.

Efficient and effective backup for data stored on such large storage systems typically involves a tradeoff between being fast and being online. For example, speed of backup can be achieved, however, online operations are often required to be suspended. Suspension, particularly for very large storage systems, can be lengthy and expensive. Balancing the needs of the system with the requirements of proper database and critical application backup has been an ongoing battle.

SUMMARY OF THE INVENTION

The invention features a redundant communication network including a plurality of production servers and a backup server; a storage system including a plurality of production volumes for storing data and a corresponding plurality of backup volumes connected to each of the production volumes. The redundant communication network also includes a first channel and a second channel for allowing communication between the production servers and the production volume of the storage system and a backup storage unit connected to the backup server.

In a general aspect of the invention, a method of performing a backup operation on the redundant communication network includes the following steps. One of the production servers selects one of the production volumes for backup. The selected one of the production volumes is disconnected from a corresponding one of the plurality of backup volumes. The relative load on each of the first and second channels of the redundant communication network is determined. If necessary, the load on each of the first and second channels is adjusted during the backup operation. Data stored on the corresponding one of the backup volumes is transferred to the backup storage unit. When the backup operation is complete, the selected one of the production volumes is reconnected to the corresponding one of the plurality of backup volumes.

With this arrangement, data used by production servers or other host computers can be backed-up, restored to or recovered from a backup storage unit while allowing, continued parallel use of the storage system by the production servers. Thus, efficiency and productivity is increased while maintaining continuous support for the production servers on the network.

Embodiments of this aspect of the invention may include one or more of the following features. Each of the backup volumes represents an independently addressable mirror image of the corresponding ones of the production volumes. Thus, the backup volume represents a point-in-time mirror image of the active production volume that can be used to run simultaneous tasks in parallel.

Adjusting the load on each of the first and second channels is performed to maximize throughput between the production servers and storage system as well as between the backup server and storage system. Alternatively, adjusting the load on each of the first and second channels is performed such that the backup operation between the backup storage unit and the corresponding backup volume occupies the load of an entire one of the first and second channels. In essence, adjusting the load provides a balanced approach to managing flow of data between the production servers, the storage system, and the backup storage unit. Load balancing ensures that the first and second channels are used in the most efficient manner possible so that one of the channels is not overloaded, when the other is under utilized. In this way, the potential for input/output (I/O) bottlenecks is minimized.

The method can further include determining the existence of a failure on either of the first channel or second channel.

The method can further include determining whether the production server, which is selecting one of the production volumes, is performing a write operation during the backup operation. If so, the load on each of the first and second channels is readjusted.

The redundant communication network operates in a Fiber Channel protocol, thereby providing a storage backbone of relatively high bandwidth, greater connectivity, and greater distance. The first channel and the second channel may be hubs or switches. The network further includes a bridge adapter for converting data passing between the backup storage unit, such as a parallel SCSI device, and the backup server. The backup storage unit is a tape storage unit, optical storage unit, etc.

Other features and advantages of the invention will become apparent from the following description, including the claims and the drawings.

DETAILED DESCRIPTION

Figure 1:
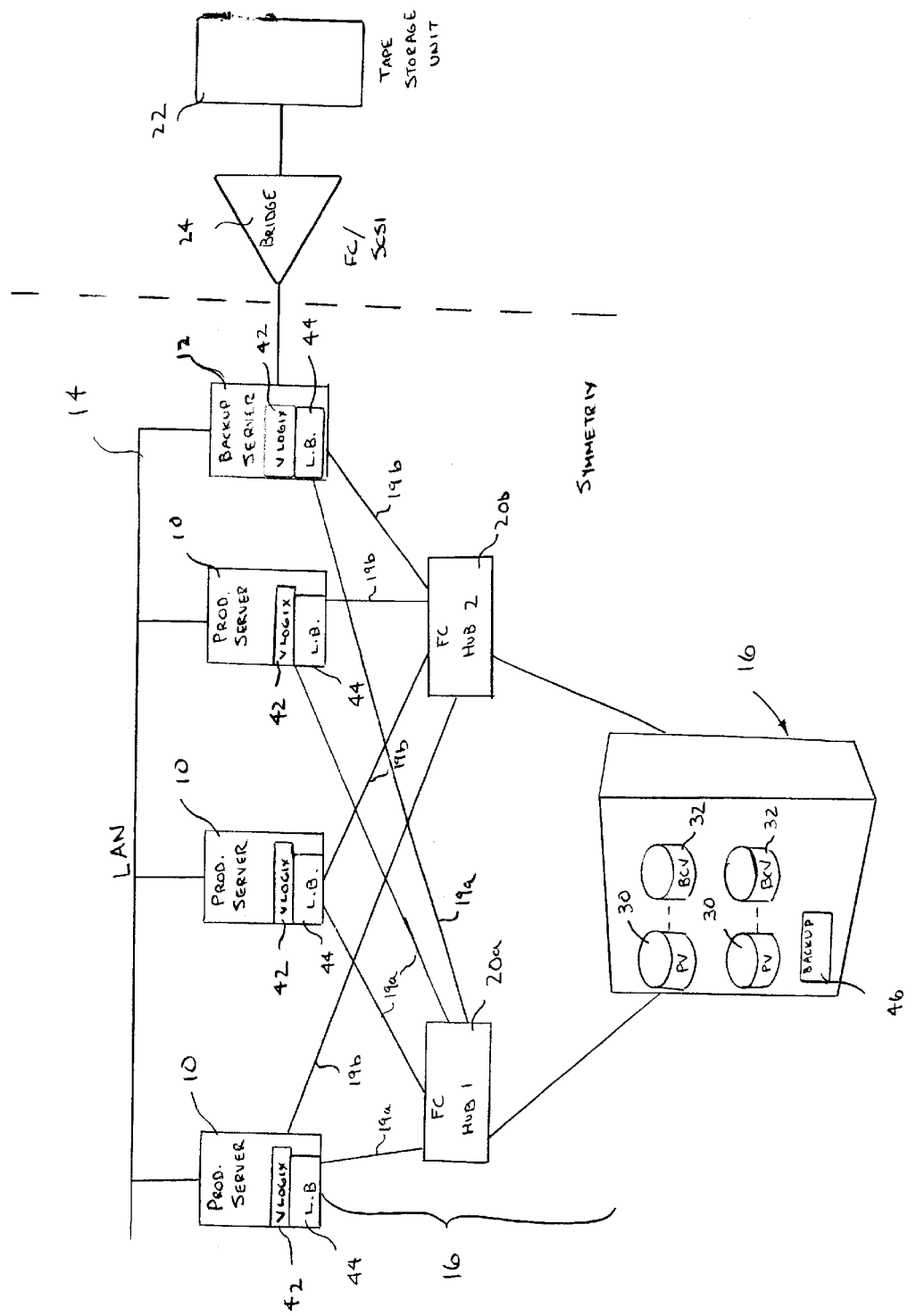
FIG. 1 is a block diagram of a network configuration of the invention.

Referring to FIG. 1, production servers 10 (here three in number) and a backup server 12 are connected to each other via a local area network (LAN) 14. Each production server 10 and backup server 12 is also coupled to a storage system 16 through a Fiber Channel (FC) network 18. Each production server 10 and backup server 12 represents a host processor, file server, or similar device, which stores and retrieves data to and from storage system 16. Fiber Channel network 18 includes a pair of hubs 20a, 20b, each connected within first and second communication channels 19a, 19b, respectively, to each of the production servers. With this configuration, a pair of redundant fiber channel loops is provided for communicating data between production servers 10, backup server 12, and storage system 16.

A tape library or tape storage unit 22 is connected to backup server 12 through a bridge adapter 24, which translates or converts data passing between the tape storage unit 22 and FC network 18. In particular, data complying with the SCSI protocol and communicated between tape storage unit 22 and backup server 12 is converted by bridge adapter 24 into FC protocol to be received by backup server 12. Similarly, bridge adapter 24 converts data from backup server 12 into the SCSI protocol before being received by tape storage unit 22. In one particular embodiment, bridge adapter 24 is incorporated within tape storage unit 22.

Storage system 16 (e.g., an EMC Symmetrix®, a product of EMC Corporation, Hopkinton, Mass.) is partitioned into production volumes 30, each of which represents a volume of the storage system that is actively accessible by production servers 10 and backup server 12. Storage system 16 also includes backup continuance volumes (BCVs) 32, each of which represents a point-in-time copy of a production volume. Once a BCV is created, it can be split from its copied production volume and used for a separate task run in parallel with a task running on the copied production volume. For example, a BCV 32 storing the copy of data can be used to test new applications or to load data warehouses. In this way, efficiency and productivity of storage system 16 is significantly increased. BCV 32 can also be used to provide a mirrored image of the active production volume for additional protection (e.g., RAID applications).

In one embodiment of the above-described network configuration, backup server 12 includes a volume configuration management (VCM) software component 42. VCM software component 42 ensures that only backup server 12 has access to BVCs 32, while each of production servers 10 only has access to their associated production volumes 30. Limiting access in this way avoids conflicts when a server seeks to access a volume. Specifically, because the BCV is a point-in-time copy of a production volume, limiting access eliminates the possibility of a server accessing multiple volumes having the same volume label.

One embodiment of a VCM software component is called Volume Logix®, a product of EMC Corporation, Hopkinton, Mass., used for controlling access to production volumes 30 and BCV 32 of storage system 16 by production servers 10 and backup server 12. In particular, VCM software component 42 provides a virtual channel connecting each server with its corresponding production volume in enterprise storage system 16, even though there may be other production servers sharing the same port of the storage system. This would be evident in an electronic serial number (ESN) environment in which the components of the system are uniquely identified by their World Wide Name (WWN). VCM software component is used to specify which production volumes, each production server 10 and backup server 12 is permitted to access and store that information in a database residing on one of the volumes of enterprise storage system 16. For example, when a production volume 10 attempts to access a production volume 30, storage system 16 will record the connection, store the host bus adapter (HBA) WWN in a login history table, query the database, and build a filter list for that HBA. VCM software component 42 processes each I/O request to insure that HBA is permitted access to the production volume. Any requests for volumes that an HBA does not have access will result in the return of an error message to the requesting production volume. Details of the VCM software component and its operation is found in co-pending application, Ser. No. 09/107,918, entitled, "Method and Apparatus for Providing Data Management for a Storage System Coupled to a Network", filed Jun. 30, 1998, which is incorporated here in by reference.

As discussed above, Fiber Channel network 18 is configured as a pair of redundant fiber channel loops for communicating data between production servers 10, backup server 12, and storage system 16. Production servers 10 and backup servers 12, therefore, can communicate with storage system 16 over different channels. To determine the most efficient channel to use, both production servers 10 and backup servers 12 include a load-balancing software component 44, called PowerPath™, a product of EMC Corporation, Hopkinton, Mass. In general, load-balancing software component 44 intelligently manages multiple I/O streams from production servers 10 and backup server 12 to storage system 16 and tape storage unit 22. In essence, during normal operations, load balancing software component 44 automatically determines the load on each of the redundant fiber channel loops, and selects which path to use in dispersing data between the servers and the storage system. That is load balancing software component 44 provides dynamic load balancing so that each server's input/output requests are spread across the fabric. For example, when one of the paths becomes busier than the other, load balancing software component 44 shifts I/O traffic from the busy path to the other, thereby further enhancing throughput over the already efficient multi-path configuration. In particular, during normal operations, it is generally preferred that each of the redundant fiber channel loops (or fabric) be only 50% provisioned. Exceeding 50% would have an effect on the performance of the production server using the loop. A more detailed description of the load balancing software component is found in co-pending application, Ser. No. 09/223,998, entitled "Method and Apparatus for Balancing Workloads in a Multi-Path Computer System," and incorporated herein by reference.

In the event of a failure of one of hubs 20a, 20b, load balancing software component 44 will recognize the failure and will respond by routing data through the operating hub. Note that backup server 12 does not use load balancing software component 44 in the load balancing mode, but only in this failover mode. Thus, load balancing software component 44 automatically and non-disruptively directs data to the alternative path. In one embodiment of a backup mode of operation, load balancing software component 44 assigns a higher priority to BCV devices 32 than to production volumes 30, thereby establishing a separate backup data transfer loop from a production data transfer loop.

As discussed above, storage system 16 is partitioned into production volumes 30 and business continuance volumes (BCVs) 32, which represents a point-in-time copy or mirror image of a production volume. The BCVs are created by a backup component 46 of storage system 16. One embodiment of a backup component is called TimeFinder™, a product of EMC Corporation, Hopkinton, Mass. TimeFinder™ creates, in background mode, the independently addressable BCVs, which can be used to run simultaneous tasks in parallel with one another. A more detailed description of the backup component is found in U.S. Pat. No. 6,101,497, entitled "Method and Apparatus for Independent and Simultaneous Access to a Common Data Set," issued Oct. 20, 2000 and incorporated by reference. This parallel processing capability, or workload compression, allows users to increase efficiency and productivity, while maintaining continuous support for the needs of the enterprise storage system. For example, once the BCVs have been created, they can be split from their mirrored production volumes and used for other tasks (e.g., testing new applications, running batch jobs, performing backup operations).

Backup component 46 also allows the user to select the source of backup data in a restore mode of operation. For example, the user can restore data from BCV 32 to a production volume or to a production volume 10 directly. A BCV 32 can also be restored from tape storage unit 22. Backup component 46 works in conjunction with load-balancing software component 44, and VCM software component 42 to ensure efficient, load-balanced backup and data recovery between servers 10, 12 and storage system 16 and tape storage unit 22.

Figure 2:
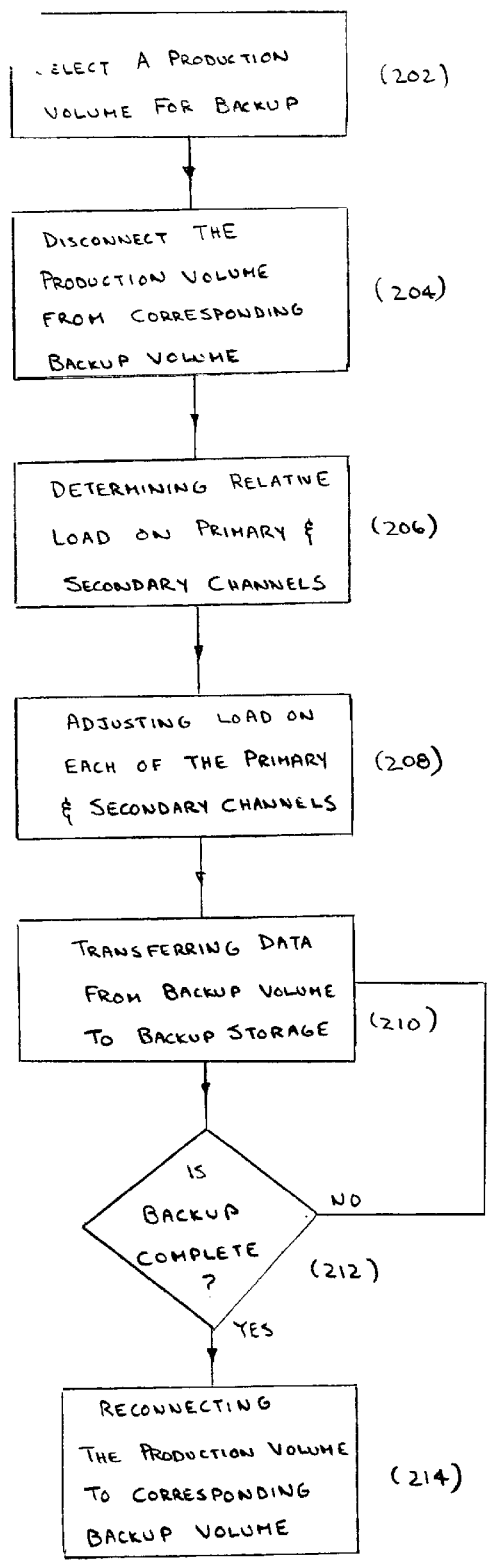
FIG. 2 is a flow diagram illustrating one approach for operating the network configuration of FIG. 1.

Referring to FIG. 2, to perform a backup operation, one of production servers 10 requests that a production volume associated with that server 30 are backed up (step 202). The VCM software component 42 associated with that production server 10 ensures that the production server is permitted to access that production volume. Backup component 42 at storage system 16 then determines whether there are any write operations being performed on that production volume. If so, backup component 42 places any production servers performing write operations to that production volume in a quiescent state by holding all input/output requests. Assuming that the production volume is permitted access, the associated production volume 30 is disconnected from its corresponding backup volume (step 204). This ensures that changes made by backup component 42 to the backup volume are not made during the backup operation. Load balancing software component 44 is then used to determine the relative load of data being communicated through hubs 20a and 20b (that is over channels 19a, 19b) (step 206). In one embodiment, load balancing software component 44 provides perfect load balancing so that the load is equally distributed between each hub. In a non-backup condition, backup server 12 presents a zero load to the system. However, when a backup operation is initiated, the load on each hub 20a, 20b must be reevaluated (step 208). In one scenario, backup server 12 is provided full use of an entire channel (e.g., hub 20b). In that case, the other production servers 10 must share the remaining ones of the hubs (in this case hub 20a) for their data transmissions. In another scenario, backup server 12 is given some fraction of the use of one of the channels. For example, if backup server 12 occupies 50% of hub 20b, production servers 10 share hub 20a and the remaining 50% of hub 20b. In either case, applications running on production servers 10 continue to run, albeit at a lower transmission rate.

Storage system 16 then transfers data from the backup volume 32 to backup server 12 where it is transferred on to tape storage unit 22 (step 210). If tape storage unit 22 is a legacy device (e.g., parallel SCSI tape unit), bridge adapter 24 is used to convert the data from a Fiber Channel protocol to a SCSI protocol. When data is transmitted in the reverse direction (i.e., from storage unit 22 to backup server 12, bridge adapter 24 perform a SCSI to Fiber Channel protocol conversion. When the backup operation is complete (step 212), the production volume is reconnected to its associated backup volume (step 214). Thus, backup component volume can provide a new point-in-time copy of the production volume, which may have changed due to data transfers between the production volume and other production servers. In addition, upon completion of the backup operation, load balancing component 44 redistributes the load over hubs 20a, 20b.

Other embodiments are within the scope of the claims. For example, although the network configuration of FIG. 1 provided redundancy through a pair of loops, other different configurations for coupling devices are also applicable. For example, the Fiber Channel network may be configured as a fabric having a hub serving as a switch, or combinations of both.

What is claimed is:

1. A method for performing a backup operation on a redundant communication network, the network including a plurality of servers having a plurality of production servers and a backup server; a storage system including a plurality of production volumes for storing data and a corresponding plurality of backup volumes connected to each of the production volumes; a first channel and a second channel for allowing communication between the production servers and the production volume, the second channel further allowing communication between the backup server and the backup volume of the storage system; and a backup storage unit connected to the backup server, the method comprising:

selecting, by one of the production servers, one of the production volumes for backup;

disconnecting the selected ones of the production volumes from a corresponding one of the plurality of backup volumes;

determining the relative load on each of the first and second channels of the redundant communication network;

adjusting, if necessary, the load on each of the first and second channels during the backup operation;

transferring data stored on the corresponding one of the plurality of backup volumes to the backup storage unit;

determining that the backup operation is complete; and re-connecting the selected ones of the production volumes from the corresponding one of the plurality of backup volumes.

2. The method of claim 1 wherein each of the backup volumes represents an independently addressable mirror image of a corresponding ones of the production volumes.

3. The method of claim 1 wherein adjusting the load on each of the first and second channels is performed to maximize throughput between the production servers and storage system and between the backup server and storage system.

4. The method of claim 3 further comprising determining the existence of a failure on either of the first channel and the second channel.

5. The method of claim 3 wherein the first channel and the second channel form at least a portion of a Fiber Channel network.

6. The method of claim 5 wherein the first channel and the second channel include a first hub and a second hub, respectively.

7. The method of claim 5 wherein network further includes a bridge adapter between the backup server and the backup storage unit, the backup storage unit being a parallel SCSI device, the bridge adapter for converting data passing between the parallel SCSI device to a Fiber Channel protocol.

8. The method of claim 7 wherein the backup storage unit includes a tape storage unit.

9. The method of claim 3 wherein determining whether the production server which is selecting one of the production volumes is performing a write operation during the backup operation.

10. The method of claim 9 further comprising preventing the write operation until the backup operation is complete.

11. The method of claim 1 wherein adjusting the load on each of the first and second channels is performed such that the backup operation between the backup storage unit and the corresponding backup volume occupies the load of an entire one of the first and second channels.

12. The method of claim 1 further comprising determining the existence of a failure on either of the first channel and the second channel.

13. The method of claim 12 wherein, following determining the existence of a failure, readjusting the load on each of the first and second channels.

14. The method of claim 1 wherein determining whether the production server which is selecting one of the production volumes is performing a write operation during the backup operation.

15. The method of claim 14 further comprising preventing the write operation until the backup operation is complete.

16. The method of claim 1 wherein the first channel and the second channel form at least a portion of a Fiber Channel network.

17. The method of claim 16 wherein the first channel and the second channel include a first hub and a second hub, respectively.

18. The method of claim 16 wherein network further includes a bridge adapter between the backup server and the backup storage unit, the backup storage unit being a parallel SCSI device, the bridge adapter for converting data passing between the parallel SCSI device to a Fiber Channel protocol.

19. The method of claim 18 wherein the backup storage unit includes a tape storage unit.

* * * * *